Figure 1:
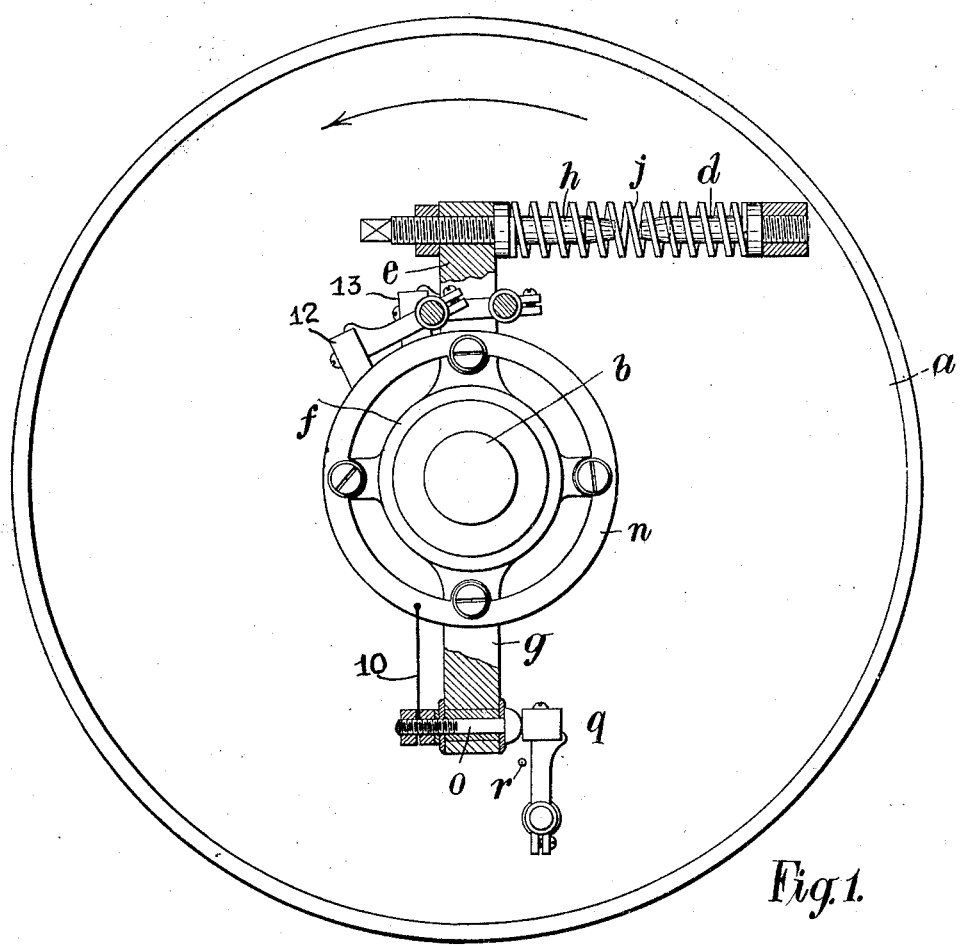

Dec. 27, 1927.

T. CLARKE 1,653,986

APPARATUS FOR CONTROLLING AND REGULATING GAS SUPPLY FOR CERTAIN PURPOSES

Filed May 12, 1923   3 Sheets-Sheet 1

Inventor
T. Clarke,
By Marks & Clerk
Attys

Dec. 27, 1927.
T. CLARKE
1,653,986
APPARATUS FOR CONTROLLING AND REGULATING GAS SUPPLY FOR CERTAIN PURPOSES
Filed May 12, 1923      3 Sheets-Sheet 3
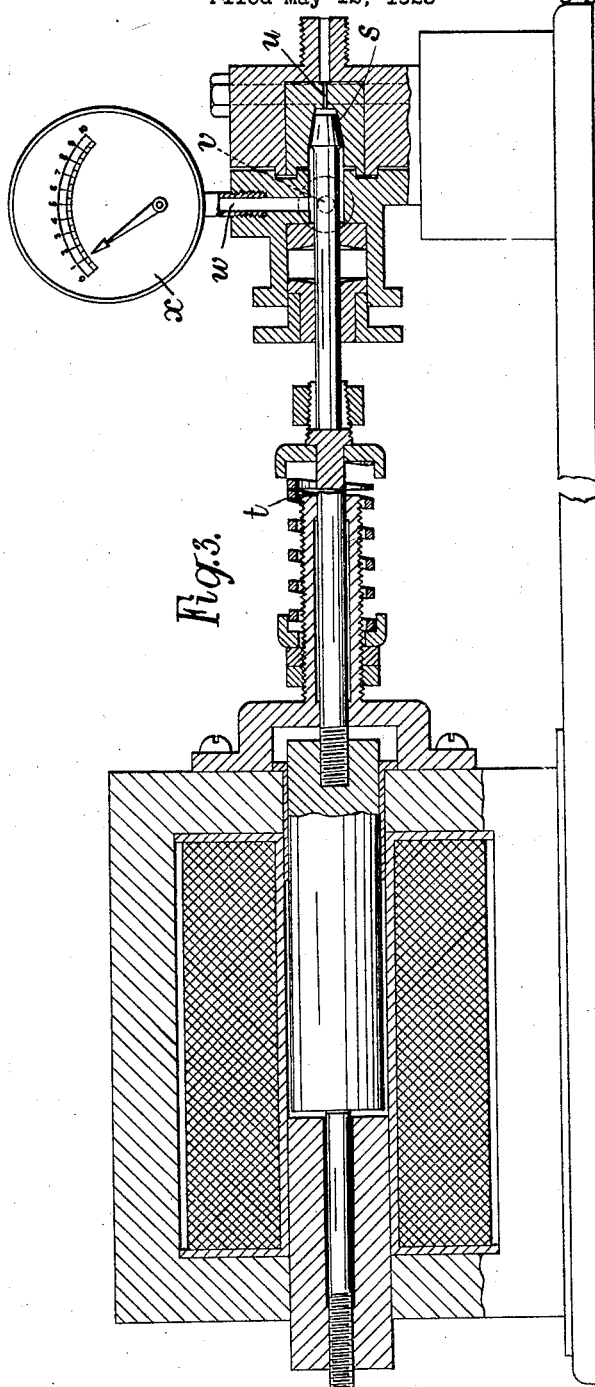

Patented Dec. 27, 1927.

1,653,986

UNITED STATES PATENT OFFICE.

THOMAS CLARKE, OF BELFAST, IRELAND.

APPARATUS FOR CONTROLLING AND REGULATING GAS SUPPLY FOR CERTAIN PURPOSES.

Application filed May 12, 1923, Serial No. 638,545, and in Great Britain July 13, 1922.

This invention relates to apparatus for controlling and regulating the supply of gas to be used in a power driven machine or other apparatus.

The invention will be described hereinafter as applied by way of example to the control and regulation of undiluted chlorine gas for the treatment of flour, such as is described in British patent specification No. 165,149.

Air containing chlorine gas in even very small quantities is poisonous. It is therefore extremely important in carrying into effect such method of treating flour that no chlorine gas be permitted to escape into the atmosphere, where it might be inhaled by the attendants. A practical difficulty in working the process has hitherto resided in the fact that the supply of flour to the agitator, in which the chlorine treatment takes place, is sometimes interrupted, and such interruption demands that the supply of chlorine gas to the agitator shall be cut off instantly by an attendant.

The gas supply is obtained from liquid chlorine stored in a tank, from which it evaporates at ordinary atmospheric temperature. When the agitator is being driven with little or no flour passing through it, the torque required to drive the agitator is less than that required for its drive when flour is passing through it at the normal working rate, and my present invention provides means whereby such deviation of torque shall effect automatic control of the gas supply.

The invention briefly consists in gas regulating apparatus including a device which automatically effects the cutting off or the turning on of the supply of gas upon deviation from a predetermined value of torque needed to drive the machine or apparatus to which the gas is supplied.

In carrying the invention into effect in one form by way of example, I provide a dog-clutch or the like through which the power to drive the agitator is transmitted. The clutch is made with a small amount of angular clearance, and is provided with a spring between its two members, which spring, when little or no power is being transmitted, serves to keep the members out of driving connection at one limit of their relative angular positions. When, however, the normal power is being transmitted to the agitator through the dog-clutch the torque overcomes the resistance of the spring and the two members are put into driving connection at the other limit of their relative angular positions, and two electrical contact points suitably mounted one upon each clutch member are pressed into contact. Slip rings are provided and brushes contacting therewith, whereby the two contacts serve to complete an electrical circuit including an actuating solenoid, serving, when energized, to retain the shut-off valve off its seat, and which when de-energized serves to permit a compression spring to close the shut-off valve. A suitable adjustable stop or the like is provided for regulating the lift of the shut-off valve, and the dog-clutch spring is made of suitable strength corresponding to a definite predetermined fraction of the driving torque for full normal working load of the agitator. By this means, when the quantity of flour being passed through the agitator falls below a predetermined value, the torque required to drive the agitator will naturally fall, and this will effect cutting off of the chlorine supply.

Figure 2:
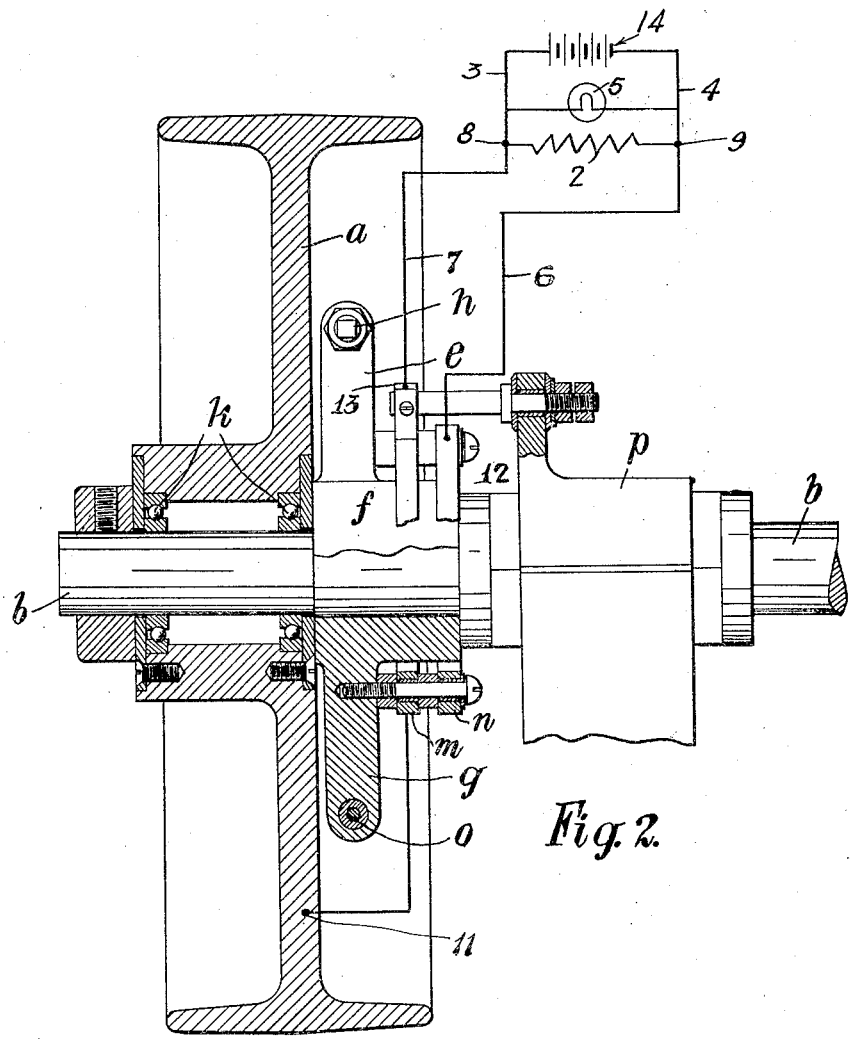

Referring to the accompanying diagrammatic drawings,

Figure 1 illustrates in end elevation a modified form of torque switch,

Figure 2 being a transverse sectional view thereof partly in elevation.

Figure 3 represents a sectional view of a convenient form of solenoid and shut-off valve constructed in accordance with the present invention.

According to the modification illustrated in Figures 1 and 2, I mount a pulley $a$ on ball bearings $k$ upon the driving shaft $b$ and provide a fixed stop $d$ upon the pulley web so that the arm $e$ is capable of partial rotation relatively to the pulley. The arm $e$ which is integral with a boss $f$, bearing a diametrically opposite arm $g$, carries an adjustable stop $h$ between which and the stop $d$ a compression spring $j$ is disposed. Upon the boss $f$ are mounted two insulated slip rings $m$, $n$, the slip ring $n$ being electrically connected by a conductor 10 to an insulated contact piece $o$ secured to the end of the arm $g$ and the slip ring $m$ being connected electrically by a conductor 11 with the pulley $a$. Adjacent the slip rings are arranged pivoted brushes 12 and 13 carried upon the fixed extension of the bearing $p$, the brushes being connected with terminals 8 and 9 by leads 7 and 6. Upon the pulley web $a$ is attached in a pivotal manner a brush $q$, a stop $r$ being provided adjacent this brush and a suitable spring (not shown) serving to retain the brush normally against the stop. The terminals 8 and 9 connected with the respective brushes are also connected to the two terminals of a solenoid winding 2 which is connected with a source of electricity supply 14 and an indicating lamp 5 by conductors 3 and 4 as shown in Fig. 2.

In operation, assuming the agitator to be driven normally under load from the pulley $a$ by means of a belt, the torque exerted by the driving shaft $b$ will be such as to cause the stop $h$ to rest in contact with the stop $d$, the pulley $a$ being rocked through a small angle in a counterclockwise direction relative to the two arms $e$ and $g$. This rocking movement is such as to retain the contact piece $o$ out of contact with the contact brush $q$, thus making incomplete the circuit between the two slip ring brushes. Under these conditions the solenoid is fully energized by the supply circuit including the current source 14 lamp 5 and conductors 3 and 4 and serves to hold the gas supply valve $s$ (Figure 3) away from its seat against the force exerted by the compression spring $t$. Gas therefore passes from the container (not shown) through the small orifice $u$ and finally through the exit conduit $v$ to the agitator.

Assuming now for any reason that the supply of flour to the agitator drops below the normal, the torque required to operate the agitator drops proportionately and thus permits the arms $g$ and $e$ to be moved by the spring $j$ in a counterclockwise direction relative to the pulley $a$ in Figure 1. In consequence of this movement the contact piece $o$ is brought into connection with the contact brush $q$, thus completing a circuit from the terminal 8 through the conductor 7, brush 13, ring $m$, conductor 11, pulley $a$, brush $q$, contact piece $o$, conductor 10, ring $n$, brush 12 and conductor 6 and thereby short circuiting the solenoid and cutting it out of action. The gas valve $s$ is thus immediately released and the supply of gas cut off from the agitator.

The quantity of gas required per unit time being relatively small, a minute orifice $u$ is provided through which the gas from the pressure chamber is conducted, the diameter of this exit orifice being of the order of 1/64th of an inch upwards. The pressure within the tank corresponding to the atmospheric temperature is greater than that within the conduit $w$, but the pressure within this conduit $w$ bears a definite relationship to the rate of flow of gas through the orifice $u$ and thus the indication of pressure on the gauge $x$ serves as an indication of the rate of flow through the orifice. The adjustable stop $y$ which serves to regulate the lift of the shut-off valve is adjusted until the necessary pressure is indicated by the pressure gauge.

The small amount of heat required to evaporate the chlorine is of course obtained from the air surrounding the tank by conduction through its holes. Closure of the shut-off valve may be arranged to take place when, say for example, half the normal quantity of flour is passing through the agitator, since the flour can completely absorb much more than twice the normal quantity of gas without any detrimental effect.

If desired, means other than the indicating lamp described above may be provided for giving visible or audible warning to the attendant when closure of the shut-off valve has been effected.

Having now described my invention what I claim as new and desire to secure by Letters Patent is:—

1. Gas-regulating apparatus including two rotating and relatively rockable members, an electrical contact on each member, a pair of slip rings on one of said members, electrical connections between each contact and one of said slip rings respectively, a pair of brushes co-acting respectively with the said slip rings, a solenoid, an electrical connection between each brush and the two ends of said solenoid respectively, a source of current supply for said solenoid and a valve adapted to be operated by said solenoid.

2. A gas-regulating apparatus including two rotating and relatively rockable members, an electrical contact member on each of the rockable members, a pair of slip rings on one of the rockable members, electrical connections between each contact and one of said slip rings respectively, a pair of brushes co-acting respectively with said slip rings, spring means normally retaining the rockable members in predetermined relation and adapted to transmit rotary movement of one of the rockable members to the other, a solenoid, an electrical connection between each brush and the two ends of said solenoid respectively, a source of current supply for said solenoid and a valve operable by said solenoid.

3. Gas-regulating apparatus including two rotatable and relatively rockable members, an electrical contact carried by each rockable member, a pair of slip rings carried by and insulated from one of the rockable members, means insulating one of the contacts from the rockable member supporting the same, the other contact being electrically connected with the rockable member carrying it, an electrical connection between the first mentioned contact and one of the slip rings, means electrically connecting the other slip ring with the rockable member connected with the second mentioned contact, brushes coacting with the slip rings, and an electric circuit including the brushes.

In testimony whereof I have signed my name to this specification.

THOMAS CLARKE.